United States Patent
Kanarek

(10) Patent No.: US 12,228,986 B1
(45) Date of Patent: *Feb. 18, 2025

(54) DEVICE, SYSTEM, AND METHOD FOR PROVIDING POWER FROM A USB-C PD CONNECTION

(71) Applicant: Core SWX, LLC, Plainview, NY (US)

(72) Inventor: Ross Kanarek, Plainview, NY (US)

(73) Assignee: Core SWX, LLC, Plainview, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/673,443

(22) Filed: May 24, 2024

Related U.S. Application Data

(63) Continuation-in-part of application No. 18/428,874, filed on Jan. 31, 2024.

(51) Int. Cl.
   *G06F 1/00* (2006.01)
   *G06F 1/26* (2006.01)
   *H01B 9/00* (2006.01)

(52) U.S. Cl.
   CPC ............. *G06F 1/266* (2013.01); *H01B 9/003* (2013.01)

(58) Field of Classification Search
   CPC ................................. G06F 1/266; H01B 9/003
   See application file for complete search history.

(56) References Cited

U.S. PATENT DOCUMENTS

| | | | |
|---|---|---|---|
| 10,181,686 B1 * | 1/2019 | Patel ...................... | H01R 13/70 |
| 10,887,116 B2 * | 1/2021 | Ramanujam .............. | G06F 1/32 |
| 10,935,221 B1 | 3/2021 | Tirosh | |
| 12,045,071 B1 * | 7/2024 | King .......................... | H02J 3/00 |
| 2015/0249848 A1 | 9/2015 | Holman | |
| 2016/0330353 A1 | 11/2016 | Ozawa et al. | |
| 2017/0351309 A1 * | 12/2017 | Hartnett .................... | H04L 12/10 |
| 2019/0120441 A1 * | 4/2019 | Wendt ....................... | F21V 23/04 |
| 2019/0129872 A1 | 5/2019 | Xu | |
| 2020/0091746 A1 | 3/2020 | Chien | |
| 2020/0106910 A1 | 4/2020 | Horie et al. | |
| 2021/0167623 A1 | 6/2021 | Sanghvi et al. | |
| 2023/0013647 A1 * | 1/2023 | Garrett ................ | H01R 13/7175 |
| 2023/0101257 A1 * | 3/2023 | Poland .................... | A61B 8/462 600/437 |
| 2024/0061483 A1 * | 2/2024 | Kim ....................... | G06F 1/1601 |

* cited by examiner

*Primary Examiner* — Mohammed H Rehman
(74) *Attorney, Agent, or Firm* — Shore IP Group, PLLC; Sean R. Wilsusen, Esq.

(57) ABSTRACT

A system for providing power from a USB-C PD connection includes a USB-C power delivery (PD) port. The USB-C PD port is configured to provide a number of output voltages. A power cable is configured to be electrically connected with the USB-C PD port. The power cable is configured to transmit data and at least one output voltage of the numerous output voltages to a peripheral device. A housing is coupled with the cable. The housing includes a USB-C connector configured to be removably coupled with the USB-C PD port to electrically connect the power cable with the USB-C PD port. A control circuit assembly is electrically connected with the housing. The control circuit assembly is configured to negotiate an output voltage of the numerous available output voltages between the peripheral device and the USB-C PD port.

17 Claims, 11 Drawing Sheets

DEVICE, SYSTEM, AND METHOD FOR PROVIDING POWER FROM A USB-C PD CONNECTION

CROSS-REFERENCE TO RELATED APPLICATIONS

The present Non-Provisional patent application is a Continuation-In-Part of U.S. patent application Ser. No. 18/428,874, filed on Jan. 31, 2024, the entire contents of which are incorporated by reference herein.

FIELD

The present disclosure relates to a USB-C Power Delivery (PD) connection and, more particularly, to a device, system, and method for providing power from the USB-C PD connection.

BACKGROUND

In the audio visual industry, there are a variety of production accessories that may be used for production. These production accessories can be powered via the same battery pack that is also powering the video/cinematic camera.

With the advent of higher voltage cinema cameras becoming more prominent due to higher power consumption and the camera manufacturer's goal in reducing current draw, the production accessories have also become either accepting of higher voltages or may be dependent upon higher voltages (e.g., as accessory manufacturers are more willing to make the accessories only high voltage accepting given the cameras have been configured that way).

A relatively high voltage power port on cinematic battery packs may provide a power delivery option for higher voltage production accessories.

SUMMARY

The present disclosure describes a multifunctional connection device configured to support power, data, and video transmission all through a single port, thus providing a versatile solution for integrating into cinematography equipment, such as cameras. Incorporating multiple functions into a single connection cable and/or connection port platform is useful in reducing a number of cables employed in a cinematography context, thus saving weight and money.

By incorporating the various functionality described herein (e.g., data transmission, ethernet connectivity, providing an audio/video interface, and providing a DC input for a device, such as a cinematography camera) into a single power port and/or connection cable, the PD PRO Power Connection and PD Pro Tap can provide a comprehensive solution for powering, data transfer, and connectivity in professional audiovisual production environments, addressing the diverse needs of industry professionals while maintaining compatibility and ease of use.

The present disclosure describes a secure, multi-voltage connection leveraging a USB-C PD port of a cinematography battery back and/or a USB-C PD port of a battery mount plate and supporting at least a USB-C PD Protocol 3.1 (e.g., offering 5 v, 9 v, 12 v, 15 v, 20 v, as well as 28 v, 36 v, and/or 48 v) or earlier protocols (e.g., USB 1.0, 2.0, or 3.0 standards).

Provided in accordance with aspects of the present disclosure is a system for providing power from a USB-C PD connection including a USB-C power delivery (PD) port. The USB-C PD port is configured to provide a number of output voltages. A power cable is configured to be electrically connected with the USB-C PD port. The power cable is configured to transmit data and at least one output voltage of the numerous output voltages to a peripheral device. A housing is coupled with the power cable. The housing includes a USB-C connector configured to be removably coupled with the USB-C PD port to electrically connect the power cable with the USB-C PD port. A control circuit assembly is electrically connected with the housing. The control circuit assembly is configured to negotiate an output voltage of the numerous available output voltages between the peripheral device and the USB-C PD port.

In an aspect of the present disclosure, the system includes a receiving orifice arranged about the USB-C PD port. A mechanical securing assembly extends from the housing. The mechanical securing assembly is arranged about the USB-C connector. The mechanical securing assembly is configured to be removably received in the receiving orifice to securely couple the housing about the USB-C PD port.

In an aspect of the present disclosure, a mechanical securing assembly is configured to removably and securely couple the housing about the USB-C PD port. The mechanical securing assembly includes a press-fit connection between the housing and the USB-C PD port, a snap-fit connection between the housing and the USB-C PD port, a tab and slot connection between the housing and the USB-C PD port, a quick-release connection between the housing and the USB-C PD port, or a detent ball connection between the housing and the USB-C PD port.

In an aspect of the present disclosure, a first metal or magnetic member is coupled with the housing. A second metal or magnetic member is arranged about the USB-C PD port. The first metal or magnetic member and the second metal or magnetic member are configured to be removably coupled with each other to securely couple the housing about the USB-C PD port.

In an aspect of the present disclosure, the control circuit assembly is arranged in the housing.

In an aspect of the present disclosure, the control circuit assembly is arranged in a second housing arranged along the power cable. The second housing is spaced apart from the housing including the USB-C connector.

In an aspect of the present disclosure, the USB-C PD port is arranged in a cinematography battery pack.

In an aspect of the present disclosure, the USB-C PD port is arranged in a battery mount plate for a cinematography battery pack.

In an aspect of the present disclosure, an electrical connector is defined at an end of the power cable opposite the housing. The electrical connector is configured to connect with a peripheral device to deliver the output voltage to the peripheral device.

In an aspect of the present disclosure, wherein the power cable includes a DC power input defined at an end of the power cable opposite the housing. The DC power input is configured to connect to a continuous DC power supply.

In an aspect of the present disclosure, the possible output voltages include 5 volts, 9 volts, 12 volts, 15 volts, 20 volts, 24 volts, 28 volts, 36 volts, and 48 volts.

In an aspect of the present disclosure, a number of visual indicators are arranged on the housing. The visual indicators are configured to indicate the output voltage of the USB-C PD port.

In an aspect of the present disclosure, a power hub is electrically connected with the power cable. The power hub includes a number of USB-C PD hub ports, each of which is configured to provide at least one of a number of output voltages.

In an aspect of the present disclosure, the housing of the power cable includes an ethernet connector engaged therewith. The ethernet connector is configured to allow the power cable to provide wired networking capabilities.

In an aspect of the present disclosure, the housing of the power cable includes at least one of a video interface or an audio interface.

Provided in accordance with aspects of the present disclosure is a power cable for providing power from a USB-C PD connection. The power cable includes a housing including a USB-C connector configured to be removably coupled with a USB-C PD port to electrically connect the power cable with the USB-C PD port. The power cable is configured to transmit at least one of a number of output voltages to a peripheral device from the USB-C PD port. The power cable is configured to transmit data to the peripheral device from the USB-C PD port. A control circuit assembly is electrically connected with the housing. The control circuit assembly is configured to negotiate an output voltage between the peripheral device and the USB-C PD port.

In an aspect of the present disclosure, the power cable includes a mechanical securing assembly extending from the housing and arranged about the USB-C connector. The mechanical securing assembly is configured to be removably received in a receiving orifice to securely couple the housing about the USB-C PD port.

In an aspect of the present disclosure, the housing includes an ethernet connector configured to allow the power cable to provide wired networking capabilities.

In an aspect of the present disclosure, the housing includes at least one of a video interface or an audio interface.

Provided in accordance with aspects of the present disclosure is a method of providing power from a USB-C PD connection. The method includes providing a power cable including a housing including a USB-C connector configured to be removably coupled with a USB-C PD port to electrically connect the power cable with the USB-C PD port. The power cable is configured to transmit at least one of a number of output voltages to a peripheral device from the USB-C PD port. A control circuit assembly is electrically connected with the housing. The control circuit assembly is configured to negotiate an output voltage between the peripheral device and the USB-C PD port. The method includes negotiating, by the control circuit, the output voltage between the peripheral device and the USB-C PD port. The method includes providing the output voltage to the peripheral device to power or charge the peripheral device. The method includes transmitting data through the power cable to the peripheral device.

BRIEF DESCRIPTION OF THE DRAWINGS

Various aspects and features of the present disclosure are described hereinbelow with reference to the drawings wherein.

DETAILED DESCRIPTION

Figure 1:
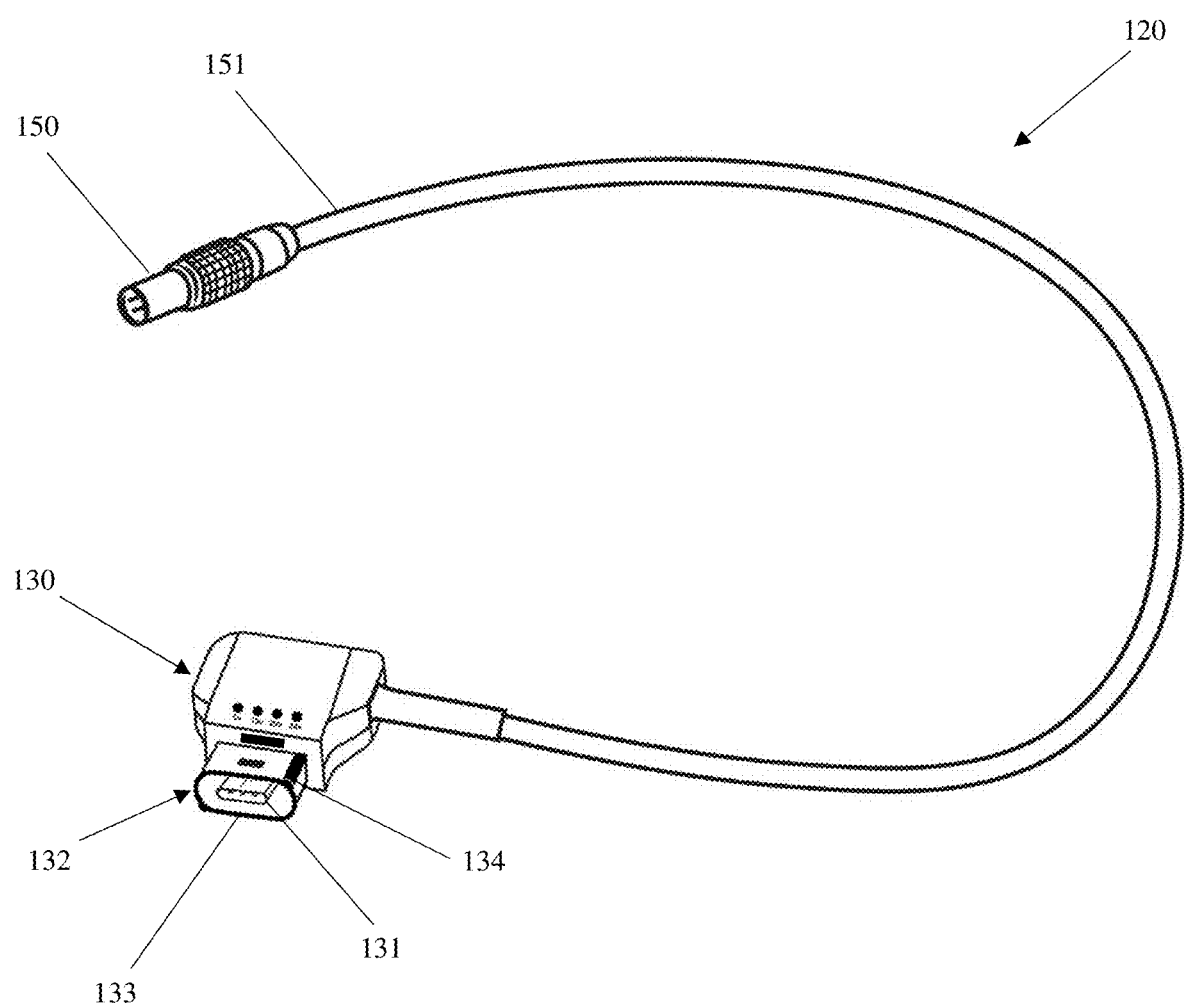
FIG. 1 is a top, perspective view of a power cable for providing power from a USB-C PD connection according to aspects of the present disclosure.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

The phrases "battery mount," "mount plate," and "battery mount plate" may be used interchangeably herein. The phrases "battery," "battery pack," "cinematography battery," "cinematography battery pack," and "pack" may be used interchangeably herein.

The devices and systems described herein (particularly the power cables described herein) are configured to provide a multifunctional device and system configured to provide data transmission, ethernet connectivity, an audio/video interface, and a DC input for a device in a single platform.

The device (e.g., power cable) and system described herein are configured to provide high-speed data transmission capabilities along with power delivery. This enables seamless transfer of data between devices such as cameras, external storage units, and/or computers through the use of a single cable and corresponding ports configured to support such functionality. The device and system described herein are configured to provide ethernet connectivity (e.g., within the connector housing), allowing for wired networking capabilities. This feature is particularly useful for transferring large video files or streaming high-quality video feeds in real-time. The device and system described herein are configured to provide a video interface in the power cables described herein, enabling audio/video input/output functionalities. This facilitates recording, monitoring, or playback directly through the power cable, thus streamlining production workflows, reducing costs, and reducing a number of cables that need to be employed to support desired functionality. The device and system described herein are configured to provide a DC power input for connecting to a continuous DC power supply, thus allowing the power ports and power cables described herein to operate as a primary or secondary DC input connector for a cinematography device.

The connectors described herein support power, data, and video transmission all through a single port, making it an ideal solution for integration into cinematography equipment, such as cinematography cameras. Given the critical consideration of size in cinematography cameras by both cinema operators and manufacturers, the ability to consolidate various functionalities into one connector is paramount.

As an example, a cinematography device (e.g., a cinematography camera) may include a port configured to connect with the power cables described herein. A single such port can provide power to a cinematography device (e.g., power ranging from 5 volts to 48 volts DC). The single port can also operate as a video output to connect to a monitor or an electric viewfinder (e.g., through a power cable, as described herein). The single port can operate as a power input, such as in a scenario in which the cinematography device does not have access to it's standalone power device (e.g., it's own battery). The single port can also provide networking capabilities to connect a series of cinematography devices (e.g., cinematography cameras) in an interconnected array. That is, all of the functionality described herein may be achieved by incorporating a USB-C PD port as described herein into a cinematography device (e.g., a cinematography camera) and connecting a multi-functional power cable as described herein with such a multi-functional port.

The power cables described herein (e.g., power cable 1300) are configured to provide the various functionality (e.g., data transmission, ethernet connectivity, providing an audio/video interface, and providing a DC input for a device, such as a cinematography camera) described herein in a bi-directional manner. That is data and/or power may be transmitted to or from a cinematography device through the power cables described herein.

Conventional cinematography accessories have been operable on a mean 12 v system (e.g., 11-17 v), based at least in part on battery packs having voltages available within the voltage range. Conventionally, a powertap or "ptap" was added to battery packs to support multi-draw capability, allowing the camera to be powered from the mains output of the battery pack and then the accessory (e.g., an on-camera light) could be powered from the ptap. Recently, the cinematography industry began utilizing 5 v equipment, and as a result manufacturers started including a USB-A port on battery packs cable of outputting 5 v and several amps of current.

According to aspects of the present disclosure, a USB-C power delivery (PD) port (see, e.g., USB-C PD port 110 in FIGS. 3-6) has been included on a battery pack or a battery mount plate capable of outputting a range of voltages (e.g., offering 5 v, 9 v, 12 v, 15 v, 20 v, as well as 28 v, 36 v, and/or 48 v). The USB-C PD port can be employed to support a range of mobile devices for charging, such as laptops for post-production editing as well as footage organization, or DSLR-type photographic cameras. The USB-C PD port can also be used to allow the battery pack to accept a charge from a USB-C PD charger, such as a USB-C PD charger employed for laptops.

The control circuit (e.g., control circuit 140) described herein is configured to communicate with a USB-C PD port (see, e.g., USB-C PD port 110 in FIGS. 3-6) to determine what voltage to output. The control circuit allows devices not designed to receive USB-C PD power to be powered using a USB-C PD port by negotiating the necessary output voltage by the control circuit. As an example, the power cable (e.g., power cable 120 in FIG. 1 or 720 in FIG. 7) can be adapted to connect with any device not designed for USB-C PD charging and charge such a device through the use of the control circuit, such that the power output needed for the device is selected through use of the control circuit.

The control circuit is configured to negotiate a "handshake" between a device that will receive power from the USB-C PD port and the output power of the USB-C PD port by communicating with each of the device that will receive power from the USB-C PD port and the USB-C PD port itself.

Referring to FIGS. 1-10, a system 100 for providing power from a USB-C PD connection includes a USB-C power delivery (PD) port 110. The USB-C PD port 110 is configured to provide a number of output voltages. The possible output voltages include, for example, 5 volts, 9 volts, 12 volts, 15 volts, 20 volts, 24 volts, 28 volts, 36 volts, and 48 volts.

A power cable 120 is configured to be electrically connected with the USB-C PD port 110. The power cable 120 is configured to transmit at least one output voltage of the numerous output voltages to a peripheral device to power and/or charge the peripheral device. For example, the power cable 120 may be configured to transmit the output voltage to at least one of a light, a microphone, a camera, a monitor, a tablet computer, a desktop computer, or a laptop computer from a battery (e.g., battery pack 301) or a battery mount plate (e.g., battery mount plate 501), as described or incorporated by reference herein.

Further, according to aspects of the present disclosure, in addition to the ability of the power cable 120 to transmit power, the power cable 120 is also configured to transmit data (e.g., high-speed data transfer). For instance, the power cable 120 may include at least one data transfer wire in addition to at least one wire for transmitting power. The ability of the power cable 120 to transmit data would enable transfer of data between devices such as cameras, external storage units, computers, etc.

A housing 130 is coupled with the power cable 120. The housing 130 includes a USB-C connector 131 configured to be removably coupled with the USB-C PD port 110 to electrically connect the power cable 120 with the USB-C PD port 110. A control circuit assembly 140 is electrically connected with the housing 130. The control circuit assembly 140 is configured to negotiate an output voltage of the numerous available output voltages between the peripheral device and the USB-C PD port 110.

The control circuit assembly 140 is configured to control the power output of the USB-C PD port 110. The control circuit assembly 140 may include a combination of electronic components such as resistors, capacitors, inductors, transistors, and integrated circuits. The control circuit assembly 140 is configured to receive and/or process an input signal (e.g., from the peripheral device, the USB-C PD port 110, a battery, and/or the battery mount plate, as described herein) to determine at least one of the available output voltages from the battery (e.g., based on the voltage demands and capabilities of the peripheral device). The control circuit assembly 140 may include one or more processing units 201 (e.g., including microcontrollers or programmable logic controllers (PLCs)). The processing unit 201 is configured to execute a set of instructions or a control algorithm to analyze the input signals and determine the appropriate output voltage. The control circuit assembly 140 may include at least one memory 202 configured to store executable computer instructions (e.g., computer software describing one or more algorithms) configured to instruct the processing unit 210 to process the input signals to select the appropriate output voltage. The algorithm(s) define the logic and decision-making process of the control circuit assembly 140. The memory 202 is configured to store the control algorithm, configuration settings, and temporary data employable by the processing unit 210. The memory 202 may include RAM (Random Access Memory) for temporary storage and read-only member (EROM) or Electrically Erasable Programmable Read-Only Memory (EEPROM) for non-volatile storage.

The memory 202 may store firmware (e.g., software or executable computer instructions) configured to control the operation of the control circuit assembly 140 to select the appropriate output voltage for a battery described or incorporated by reference herein. The firmware is updatable, such as to improve or update the operation of the control circuit assembly 140.

Figure 2A:
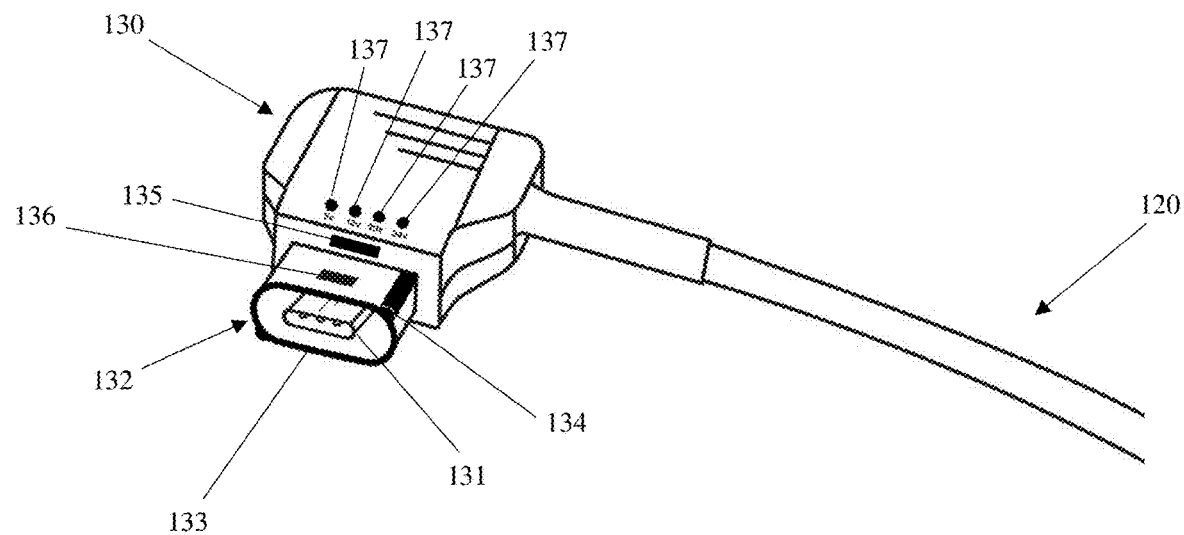
FIG. 2A is a top, perspective view of a USB-C PD connection employable by the power cable of FIG. 1.
Figure 2B:
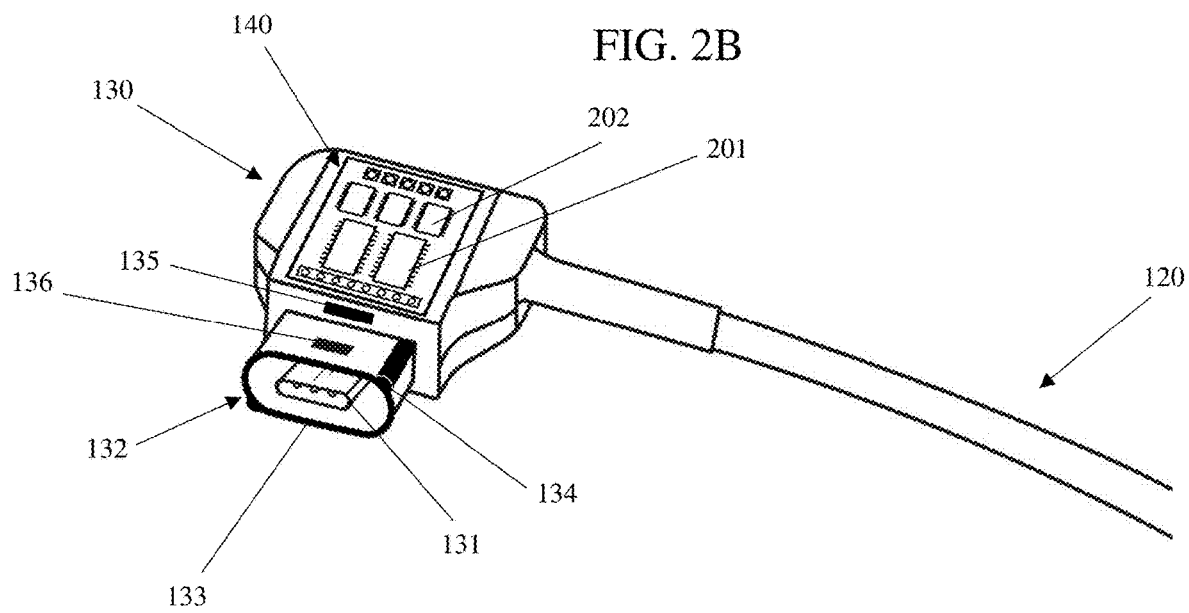
FIG. 2B is an interior view of the control circuit assembly of the USB-C PD connection of FIG. 2A employable by the power cable of FIG. 1.
Figure 3:
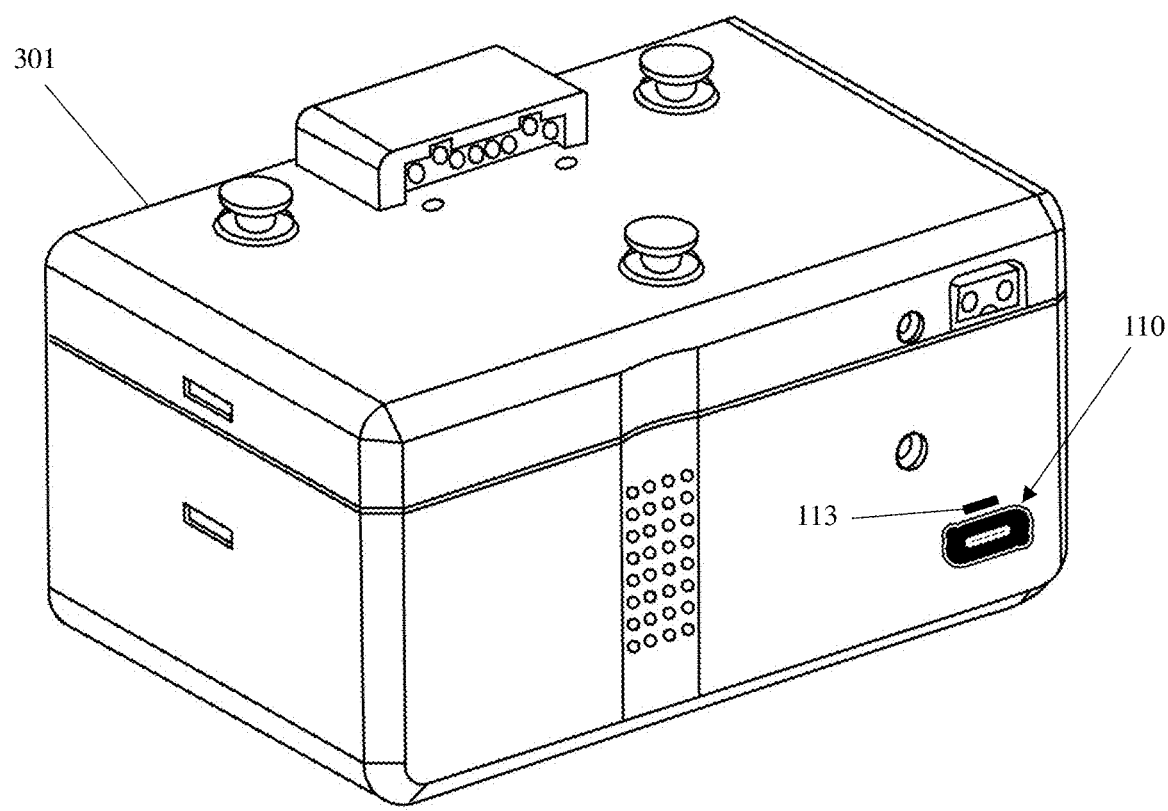
FIG. 3 is a top, perspective view of a cinematography battery pack including a USB-C PD port configured to connect with the USB-C PD connection of the power cable of FIG. 1.
Figure 4:
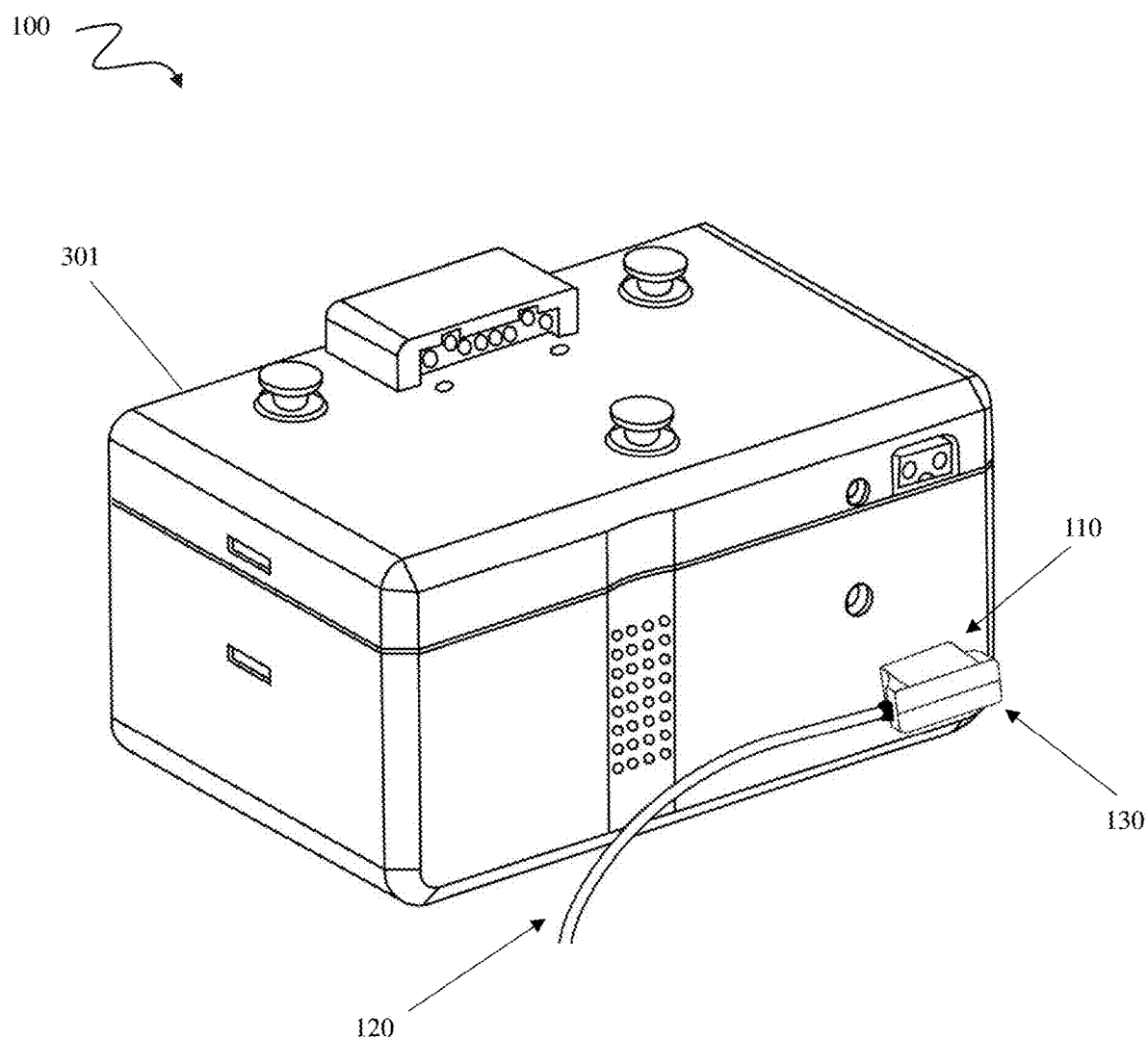
FIG. 4 is a top, perspective view of the power cable of FIG. 1 connected with the USB-C PD port of FIG. 3.
Figure 5:
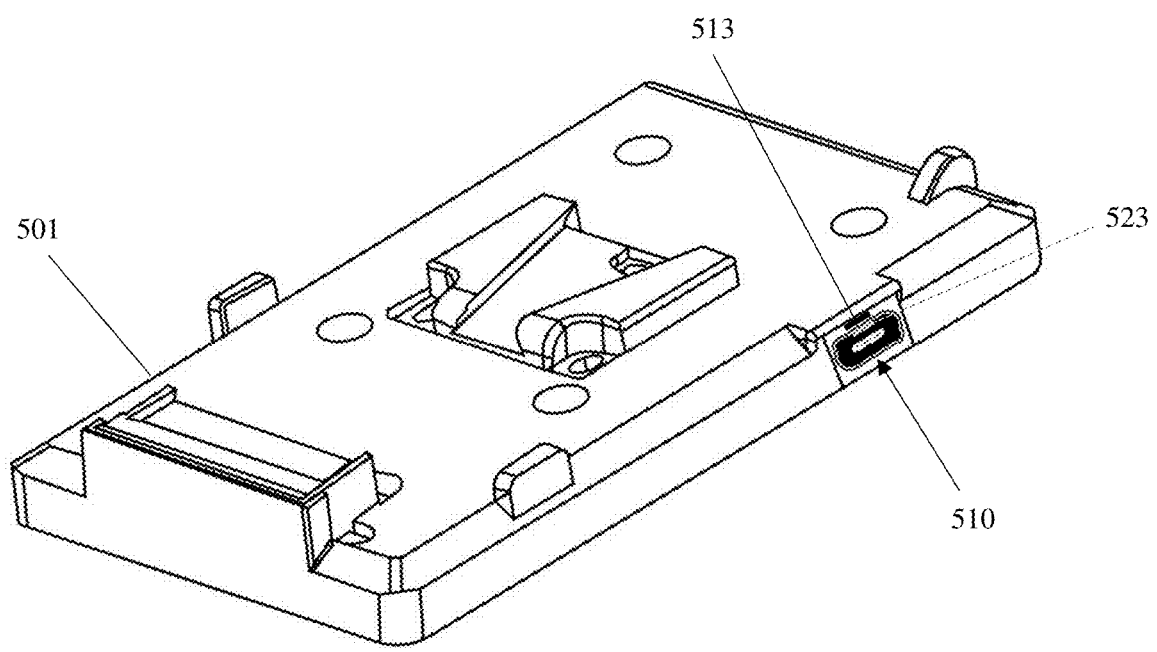
FIG. 5 is a front, perspective view of a battery mount plate for a cinematography battery pack including a USB-C PD port configured to connect with the USB-C PD connection of the power cable of FIG. 1.
Figure 6:
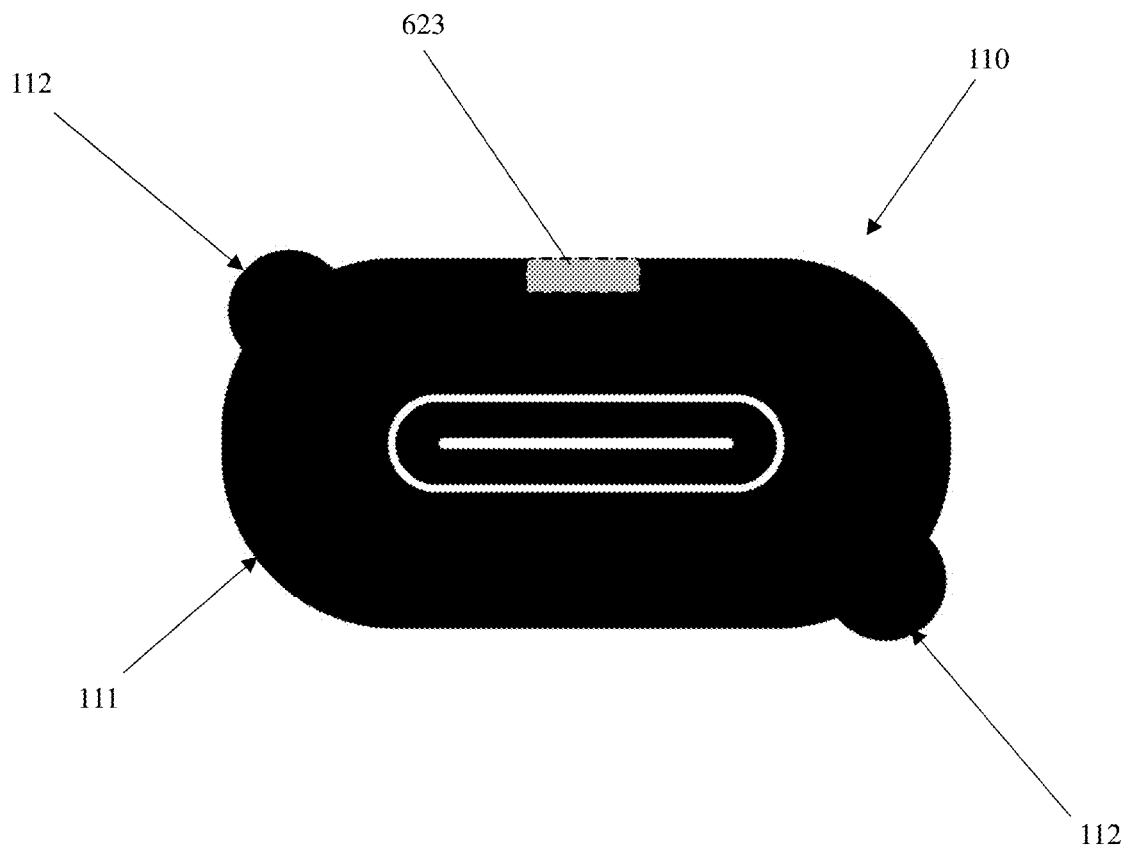
FIG. 6 is an enlarged view of a USB-C PD port employable by the cinematography battery pack of FIG. 3 or the battery mount plate of FIG. 5.

Referring particularly to FIGS. 2A, 2B, and 6, the system 100 includes a receiving orifice 111 arranged about the USB-C PD port 110. A mechanical securing assembly 132 extends from the housing 130. The mechanical securing assembly 132 is arranged about the USB-C connector 131. The mechanical securing assembly 132 is configured to be removably received in the receiving orifice 131 to securely couple the housing 130 about the USB-C PD port 110.

In an aspect of the present disclosure, the mechanical securing assembly 132 includes a shroud 133 arranged at least partially circumferentially around the USB-C connector 131. A space may be defined between an inner surface of the shroud 133 and an outer surface of the USB-C connector 131. The shroud 133 is configured to be removably received in the receiving orifice 111 to removably couple the housing 130 with a battery (e.g., battery pack 301) or a battery mount plate (e.g., battery mount plate 501), as described or incorporated by reference herein.

In an aspect of the present disclosure, a slot 112 is defined in the receiving orifice 111 and may extend outwardly therefrom. A projection 134 may extend from the shroud 133. The projection 134 is configured to be removably received in the slot 112. As an example, two slots and two corresponding projections may be defined about the shroud 133; however, other arrangements may be employed, and a single or three or more projections and corresponding slots may be employed. The projection(s) and corresponding slots may define a semi-circular or semi-oval shape; however, other arrangements may similarly be employed.

The mechanical connection assembly 132 may include a press-fit connection between the housing 130 and the USB-C PD port 110, a snap-fit connection between the housing 130 and the USB-C PD port 110, a tab and slot connection between the housing 130 and the USB-C PD port 110, a quick-release connection between the housing 130 and the USB-C PD port 110, or a detent ball connection between the housing 130 and the USB-C PD port 110.

The mechanical securing assembly 132 may extend at substantially a 90 degree angle with respect to an extending direction of power cable 120. Thus, in use, the housing 130 might not be physically removable from USB-C PD port 110 by pulling along the extending direction of power cable 120. This prevents unwanted removable of the mechanical securing assembly 132 from the USB-C PD port 110, thus preventing unwanted disruption in an electrical connection between the USB-C PD port 110 and a peripheral device. That is, disconnecting the mechanical securing assembly 132 and correspondingly the housing 130 from the USB-C PD port 110 may require advancing the housing 130 away from the USB-C PD port 110 at an angle of about 90 degrees with respect to the extending direction of the power cable 120.

The USB-C PD connections described are generally not polarity sensitive and may be rotated 180 degrees without a change in connectivity. That is, the housing 130 may be rotated 180 degrees with respect to the orientation illustrated in FIGS. 2A and 2B and can be similarly connected with USB-C PD port 110 both physically and electrically.

Referring particularly to FIGS. 2A, 2B, 3, 5, and 6 at least one metal or magnetic member (see, e.g., magnetic member 135) is coupled with or integrated into the housing 130. At least one corresponding metal or magnetic member (see, e.g., magnetic member 113 in FIG. 3) is arranged about the USB-C PD port 110 and configure to connect with magnetic member 135. A similar metal or magnetic member (see, e.g., magnetic member 513 in FIG. 5) may be arranged about port 510 of exemplary battery mount plate 501 (see FIG. 5). Additionally, or alternatively, another metal or magnetic member (see, e.g., magnetic member 136 in FIGS. 2A and 2B) may be arranged on the shroud 133 and configured to connect with a corresponding metal or magnetic member within a USB-C PD port (see, e.g., magnetic member 523 arranged in USB-C PD port 510 of battery mount plate 501 in FIG. 5, or magnetic member 623 arranged in USB-C PD port 110 of battery 501 in FIG. 6). The metal or magnetic members are configured to be removably coupled with each other to securely couple the housing 130 about the USB-C PD port 110.

Unless otherwise indicated herein, port 510 has substantially the same arrangement as port 110 described herein, and thus duplicative descriptions may be omitted.

In an aspect of the present disclosure, magnetic member 136 may be replaced with a protrusion configured to mate with a corresponding orifice defined in a USB-C PD port. That is, magnetic members 523 and/or 623 may be replaced with an orifice within the corresponding USB-C PD port to receive a protrusion therein.

In an aspect of the present disclosure, the shroud 133 may be omitted, and the metal/magnetic connections described herein may be employed to couple housing 130 with the USB-C PD port 110.

Figure 7A:
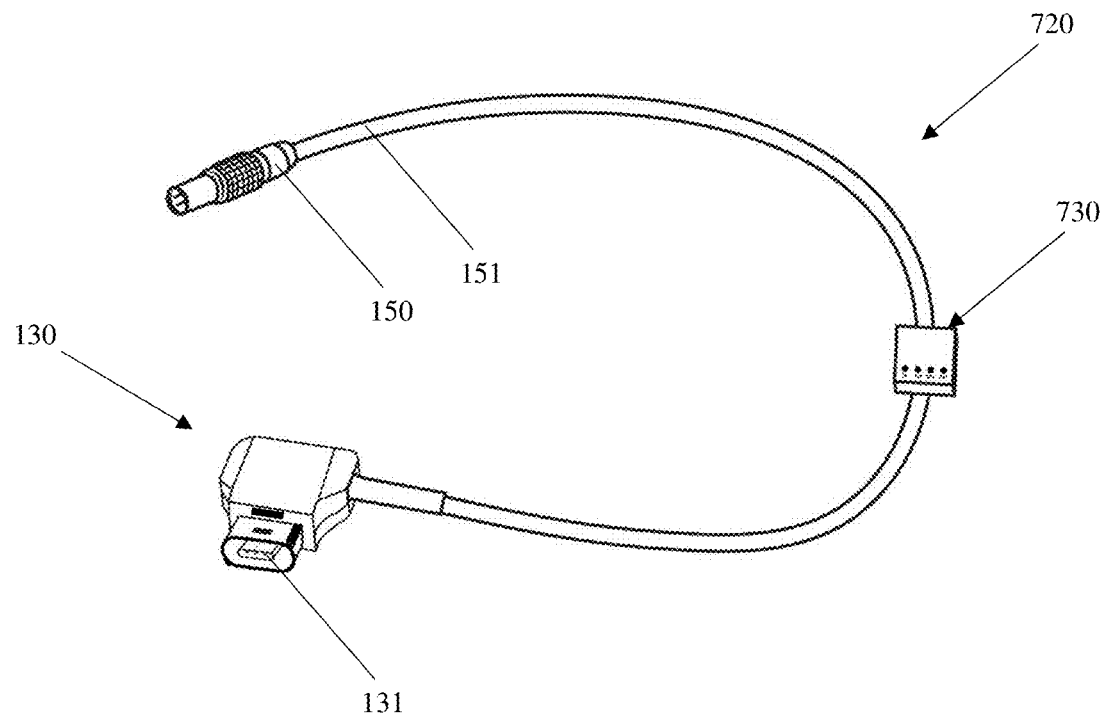
FIG. 7A is a top, perspective view of a power cable for providing power from a USB-C PD connection according to aspects of the present disclosure.
Figure 7B:
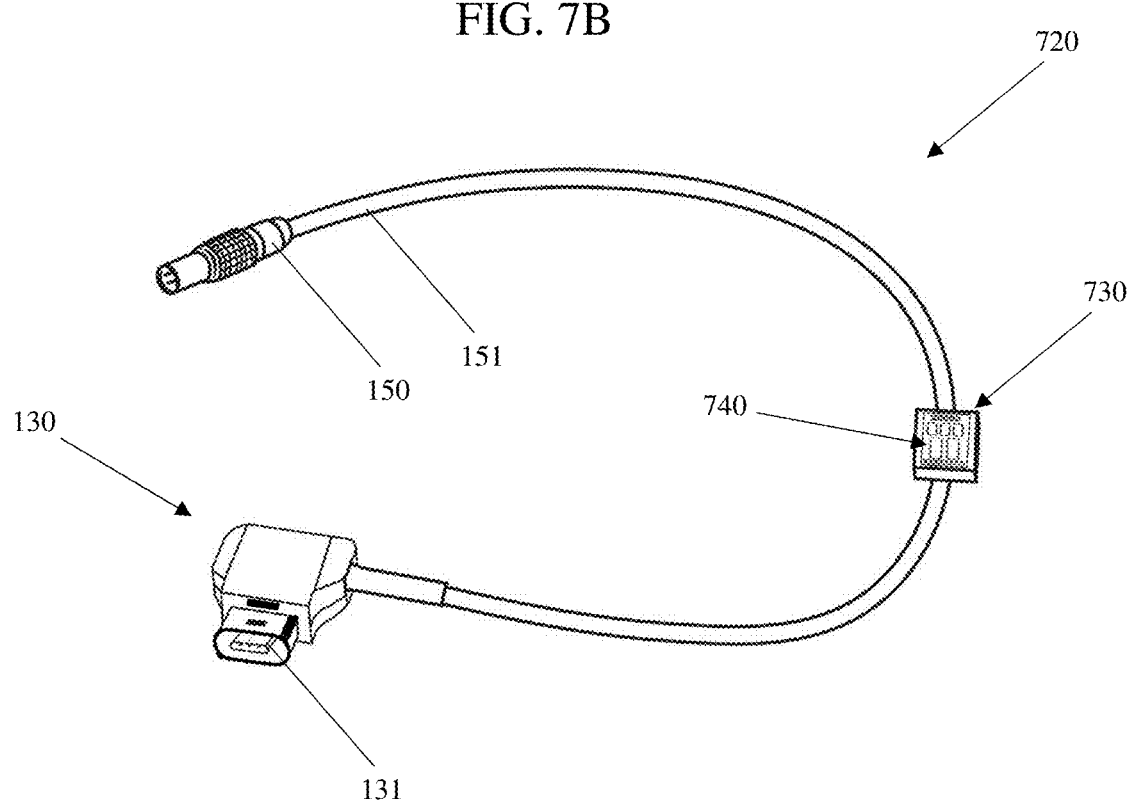
FIG. 7B is an interior view of the control circuit assembly of the power cable of FIG. 7A.

Unless otherwise indicated below, control circuit assembly 740 described below with reference to FIGS. 7A and 7B is substantially the same as control circuit assembly 140 described herein, and thus duplicative descriptions may be omitted.

Referring particularly to FIGS. 7A and 7B, the control circuit assembly 740 may be arranged in a housing 730 arranged along the power cable 720. The housing 730 holding the control circuit assembly 740 is spaced apart from the housing 130 including the USB-C connector 131.

In an aspect of the present disclosure, the USB-C PD port (e.g., port 110 or port 510) is configured to charge the cinematography battery pack 301. That is, while the USB-C PD ports described herein may be employed to output a desired voltage, the same ports may also be employed to provide a charging voltage to the cinematography battery pack 301 to charge the cinematography battery pack 301. As an example, the power cable 120 described herein may be employed to charge the cinematography battery pack 301. The USB-C PD port is configured to receive a number of available charging voltage from a power source, such as 5 v, 9 v, 12 v, 15 v, 20 v, 28 v, 36 v, and/or 48 v.

Referring particularly to FIGS. 1, 7A and 7B, an electrical connector 150 is defined at an end 151 of the power cable 120 opposite the housing 130. A substantially identical electrical connector 150 may be defined at end 151 of cable 720. The electrical connector 150 is configured to connect with a peripheral device to deliver the output voltage to the peripheral device. For example, the power cables 120 or 720 may be configured to transmit the output voltage to at least one of a light, a microphone, a camera, a monitor, a tablet computer, a desktop computer, or a laptop computer from a battery (e.g., battery pack 301) or a battery mount plate (e.g., battery mount plate 501), as described or incorporated by reference herein. As an example, the electrical connector may be a circular interconnect. Alternatively, the electrical connector may be a USB style interconnect.

Referring particularly to FIG. 2A, a number of visual indicators 137 are arranged on the housing 130. Similar visual indicators may be around on housing 730. The visual indicators 137 are configured to indicate the output voltage of the USB-C PD port.

Figure 8:
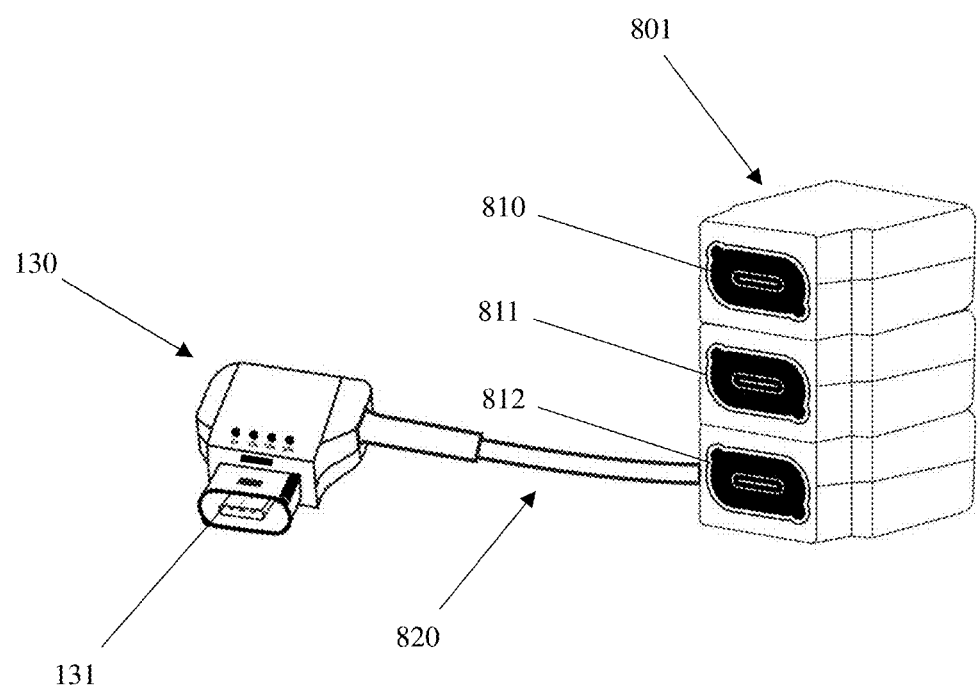
FIG. 8 is a top, perspective view of a power hub configured to connect with a USB-C PD port according to aspects of the present disclosure.

Unless otherwise indicated below, power cable 820 described below with reference to FIG. 8 is substantially the same as power cable 120 described herein, and thus duplicative descriptions may be omitted.

Referring to FIG. 8, a power hub 801 is electrically connected with the power cable 820 including housing 130. The power hub 801 includes a number of USB-C PD hub ports (e.g., ports 810, 811, and/or 812), each of which is configured to provide at least one of a number of output voltages. As an example, each hub port may be configured to output a different voltage. Each port (e.g., ports 810, 811, and/or 812) may have substantially the same arrangement as port 110 described herein.

An exemplary switching circuit for cinematography battery pack 301 is described in U.S. Pat. No. 10,630,095, the entire contents of which are incorporated by reference herein. The switching circuit may be employed to switch the output voltage provided by cinematography battery pack 301.

Dual voltage battery packs are described in U.S. Pat. No. 11,735,841, the entire contents of which are incorporated by reference herein, and U.S. Pat. No. 11,770,012, the entire contents of which are incorporated by reference herein.

The battery mount plate (e.g., mount plate 501) may be in the form of various battery mount arrangements, such as V-mount, G-mount, B-mount, or other arrangements configured to connect with a corresponding cinematography battery pack (e.g., cinematography battery pack 301) vie an electromechanical connection. Mount plates having different mounting arrangements for connecting with different types of batteries is described in U.S. Pat. No. 10,197,630, the entire contents of which are incorporated by reference herein. A mount plate having various features is described in U.S. Pat. No. 10,841,492, the entire contents of which are incorporated by reference herein.

Figure 9:
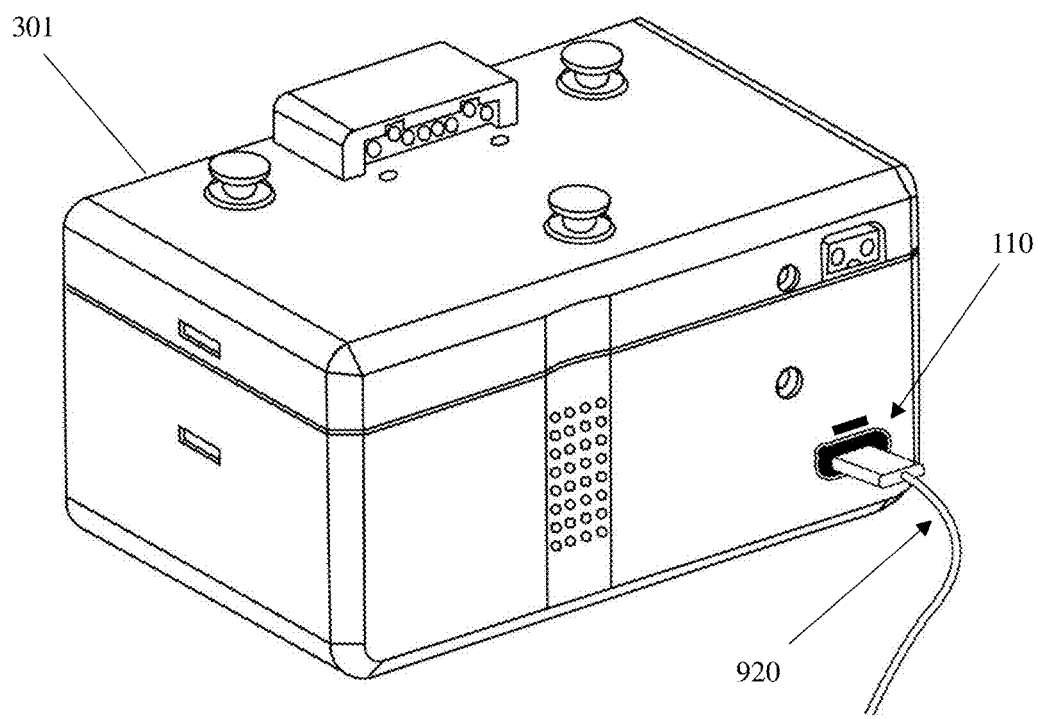
FIG. 9 is a top, perspective view of a cinematography battery pack including a USB-C PD port configured to connect with the USB-C PD connection of the power cable of FIG. 1 with a conventional USB-C device connected thereto.

Referring particularly to FIG. 9, should a standard USBC cable 920 be connected to the port 110 of the battery pack (e.g., pack 301 in FIG. 3) or plate (e.g., plate 501 in FIG. 5), and a USB-C PD compatible device is connected to the opposite end of the cable 920, the device will negotiate what voltage is required and upon successful "handshake" the port 110 will output the proper voltage.

Figure 10:
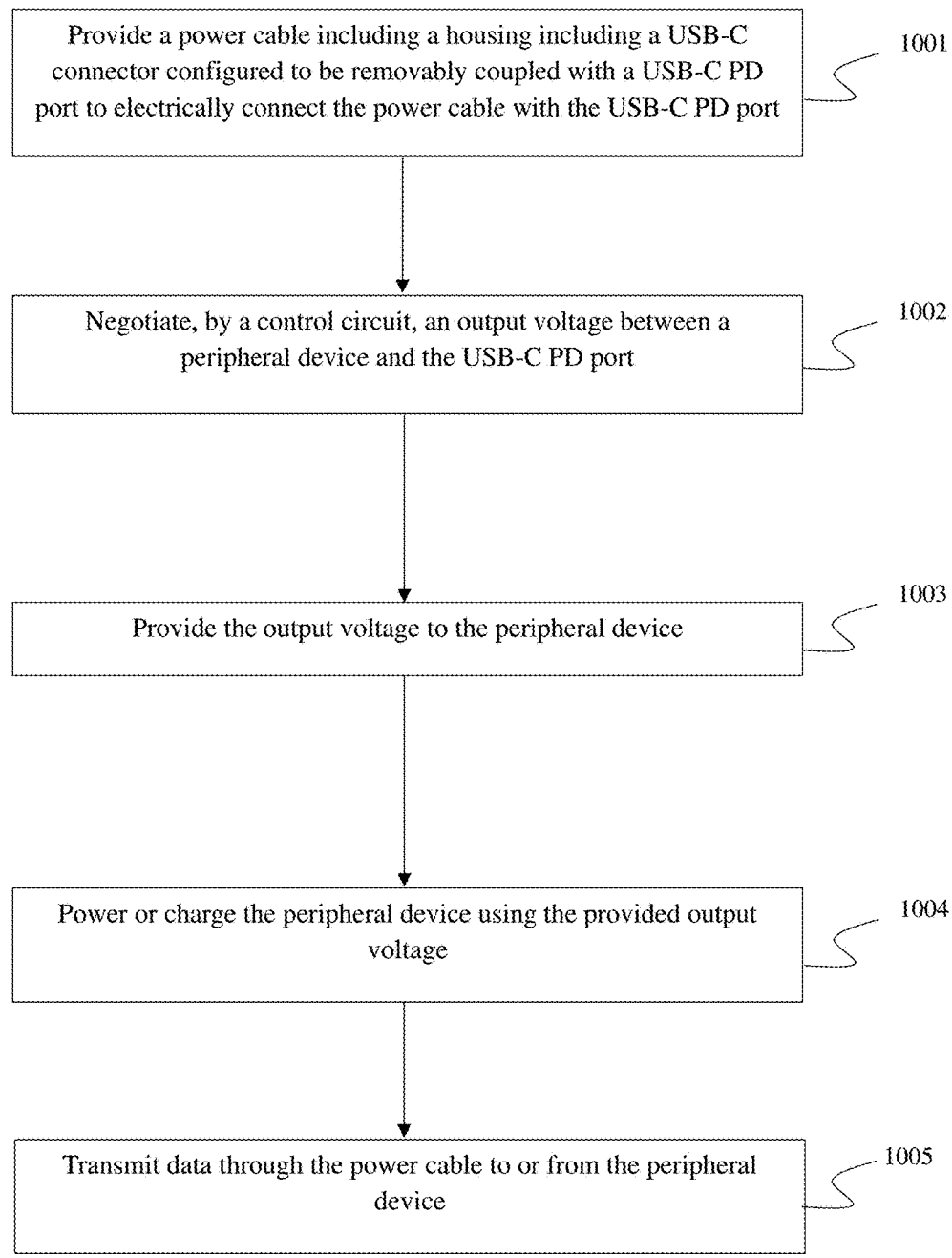
FIG. 10 is a method of providing power from a USB-C PD connection according to aspects of the present disclosure.

Referring particularly to FIG. 10, a method 1000 of providing power from a USB-C PD connection includes providing a power cable including a housing including a USB-C connector configured to be removably coupled with a USB-C PD port to electrically connect the power cable with the USB-C PD port 1001. The power cable is configured to transmit at least one of a number of output voltages to a peripheral device from the USB-C PD port. A control circuit assembly is electrically connected with the housing. The control circuit assembly is configured to negotiate an output voltage between the peripheral device and the USB-C PD port. The method includes negotiating, by the control circuit, the output voltage between the peripheral device and the USB-C PD port 1002. The method includes providing the output voltage to the peripheral device 1003. The method includes powering or charging the peripheral device using the provided output voltage 1004. The method includes transmitting date through the power cable to or from the peripheral device 1005.

Figure 11:
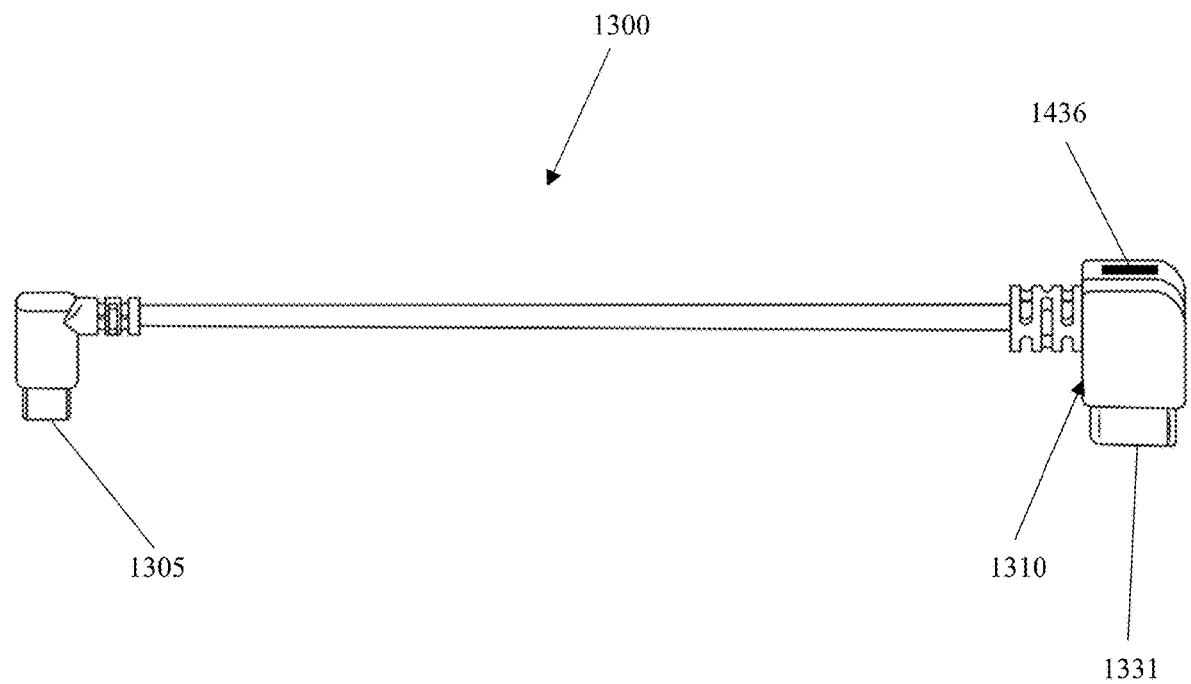
FIG. 11 is a side view of a power cable according to aspects of the present disclosure.

In accordance with aspects of the disclosure illustrated in FIG. 11, an additional embodiment of a power cable 1300 is shown. The power cable 1300 is capable of performing each of the functions (e.g., data transmission, ethernet connectivity, providing an audio/video interface, and providing a DC input for a device, such as a cinematography camera) described herein. As an example, power cable 1300 may include a USB-C connection at opposite ends thereof.

The power cable 1300 includes a USB-C PD connector 1305 and a housing 1310 including a USB-C connector 1331 extending therefrom. The USB-C PD connector 1305 may function as a DC power connector, and may connect with a cinematography device. The housing 1310 is similar to the housing 130 described in connection with FIGS. 1-8, for instance, and is configured to be removably coupled with a USB-C PD port (e.g., port 110) to electrically connect the power cable 1300 with the USB-C PD port.

The DC power connector 1305 enables the power cable 1300 to function as a DC power input for connecting to a continuous DC power supply. The DC power connector 1305 thereby allows the power cable 1300 to have utility beyond battery-powered scenarios by acting as a primary or secondary DC input connector for a peripheral device, for instance.

In accordance with aspects of the disclosure, the USB-C PD connector 1305 may include a locking assembly configured to securely couple the USB-C PD connector 1305 with a cinematography device. For example, a cinematography camera including a port configured to perform each of the functions described herein (e.g., data transmission to/from the camera, ethernet connectivity to/from the camera, providing an audio/video interface, and providing a DC input to the camera) may also include an assembly configured to prevent unwanted removal of USB-C PD connector 1305 from the camera. Thus, each connection end of cable 1300 may be securely coupled with a corresponding port (e.g., a USB-C PD port) to which it is connected.

Unless otherwise indicated below, the housing 1410 may be substantially similar to the other housings (e.g., housing 130) described herein, and thus duplicative descriptions may be omitted below.

Figure 12:
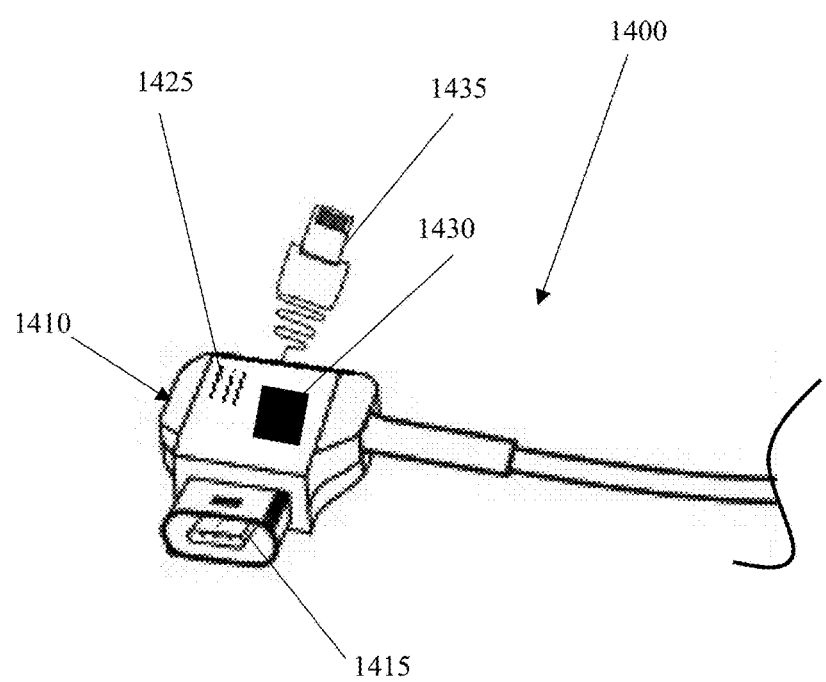
FIG. 12 is a top, perspective view of an end of a power cable according to aspects of the present disclosure.

In accordance with aspects of the disclosure illustrated in FIG. 12, yet another embodiment of a power cable 1400 is shown. The illustrated end of the power cable 1400 includes a housing 1410, which may be employed by power cable 1300. The housing 1410 includes a USB-C connector 1415 configured to be removably coupled with a USB-C PD port (e.g., port 110) to electrically connect the power cable 1400 with the USB-C PD port. A control circuit assembly (not explicitly shown in this embodiment, but similar to the control circuit assembly 140, described above) is electrically connected with the housing 1410. The control circuit assembly is configured to negotiate an output voltage of the numerous available output voltages between the peripheral device and the USB-C PD port.

The control circuit assembly is also configured to regulate a transmission of data to or from a cinematography device connected with power cable 1400. For example, power cable 1400 is capable of transmitting data in a bi-directional manner, and the control circuit assembly is configured to control the transmission of such data.

The housing 1410 also includes an audio interface 1425 and a video interface 1430. The control circuit assembly (e.g., assembly 140) within the housing 1410 communicates with the audio interface 1425 and the video interface 1430, for instance, to enable the housing 1410 of the power cable 1400 to have audio/video input/output capabilities. For instance, the audio interface 1425 and the video interface 1430 can work similarly to a speaker and viewfinder, respectively, of a camera to allow a user to monitor what is being or what has been recorded by a camera connected to the power cable 1400, thereby streamlining production workflows, for example. The audio interface 1425 and a video interface 1430 may each be embodied as communication ports configured to transmit or receive audio or video data via housing 1410. Further details of the housing 1410 are similar to the housing 130 described in connection with FIGS. 1-8, for instance, and are not described in further detail herein in the interest of clarity and brevity.

With continued reference to FIG. 12, the power cable 1400 is shown including an ethernet connector 1435 extending from the housing 1410. The ethernet connector 1435 is configured to selectively engage an ethernet port of an external device, such as a computer. Thus, the power cable 1400 incorporating the ethernet connector 1435 enables wired networking capabilities, and may be useful for transferring large video files and/or streaming high-quality video feeds in real-time, for instance. The control circuit assembly (e.g., assembly 140) within the housing 1410 communicates with the ethernet connector 1435 to enable the power cable 1400 to have and optimize ethernet connectivity. While an ethernet connector 1435 is shown a described, the housing 1430 may similarly include an ethernet port (see, e.g., ethernet port 1436 in FIG. 11, which may similarly be incorporated into housing 1410) and an ethernet cable may be employed to connect the housing 1430 with another ethernet communication capable device, such as through an additional ethernet port to ethernet port cable.

While the illustrated embodiment of the power cable 1400 includes the audio interface 1425, the video interface 1430, and the ethernet connector 1435, aspects of the present disclosure also include a power cable with only one or two of these three features.

Additionally, while only one end of the power cable 1400 is shown in FIG. 12, the other end of the power cable 1400 may include the same or similar electrical connector 150 of the power cable 120, described above, such that the electrical connector 150 is configured to connect with a peripheral device to deliver the output voltage and data to the peripheral device. The other end of power cable 1400 may also include the connections of housing 1310 described herein with particular reference to FIG. 11.

Further, according to aspects of the present disclosure, in addition to the ability of the power cables 1300 and 1400 to transmit power, the power cables 1300 and 1400 are also configured to transmit data (e.g., high-speed data transfer). For instance, the power cables 1300 and 1400 may include at least one data transfer wire in addition to at least one wire for transmitting power. The ability of the power cables 1300 and 1400 to transmit data enables transfer of data between devices such as cameras, external storage units, computers, etc.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A system for providing power from a USB-C PD connection, comprising:
    a USB-C power delivery (PD) port, wherein the USB-C PD port is configured to provide a plurality of output voltages;
    a power cable configured to be electrically connected with the USB-C PD port, wherein the power cable is configured to transmit at least one output voltage of the plurality of output voltages to a peripheral device, wherein the power cable is configured to transmit data to or from the peripheral device;
    a housing coupled with the power cable, wherein the housing includes a USB-C connector configured to be removably coupled with the USB-C PD port to electrically connect the power cable with the USB-C PD port;
    a control circuit assembly electrically connected with the housing, wherein the control circuit assembly is configured to negotiate an output voltage of the plurality of output voltages between the peripheral device and the USB-C PD port; and
    a mechanical securing assembly configured to removably and securely couple the housing about the USB-C PD port, wherein the mechanical securing assembly includes at least one of a press-fit connection between the housing and the USB-C PD port, a snap-fit connection between the housing and the USB-C PD port, a tab and slot connection between the housing and the USB-C PD port, a quick-release connection between the housing and the USB-C PD port, or a detent ball connection between the housing and the USB-C PD port.

2. The system of claim 1, further including;
    a first metal or magnetic member coupled with the housing; and
    a second metal or magnetic member arranged about the USB-C PD port, wherein the first metal or magnetic member and the second metal or magnetic member are configured to be removably coupled with each other to securely couple the housing about the USB-C PD port.

3. The system of claim 1, wherein the control circuit assembly is arranged in the housing.

4. The system of claim 1, wherein the control circuit assembly is arranged in a second housing arranged along the power cable, wherein the second housing is spaced apart from the housing.

5. The system of claim 1, wherein the USB-C PD port is arranged in a cinematography battery pack.

6. The system of claim 1, wherein the USB-C PD port is arranged in a battery mount plate for a cinematography battery pack.

7. The system of claim 1, further including an electrical connector defined at an end of the power cable opposite the housing, wherein the electrical connector is configured to connect with a peripheral device to deliver the output voltage of the plurality of output voltages to the peripheral device.

8. The system of claim 1, wherein the power cable further includes a DC power input defined at an end of the power cable opposite the housing, wherein the DC power input is configured to connect to a continuous DC power supply.

9. The system of claim 1, wherein the plurality of output voltages includes 5 volts, 9 volts, 12 volts, 15 volts, 20 volts, 24 volts, 28 volts, 36 volts, and 48 volts.

10. The system of claim 1, further including a plurality of visual indicators arranged on the housing, wherein the visual indicators of the plurality of visual indicators are configured to indicate the output voltage of the plurality of output voltages.

11. The system of claim 1, further including a power hub electrically connected with the power cable, wherein the power hub includes a plurality of USB-C PD hub ports configured to provide at least one output voltage of the plurality of output voltages.

12. The system of claim 1, wherein the housing of the power cable includes an ethernet connector engaged therewith, wherein the ethernet connector is configured to allow the power cable to provide wired networking capabilities.

13. The system of claim 1, wherein the housing of the power cable includes at least one of a video interface or an audio interface.

14. A power cable for providing power from a USB-C PD connection, comprising:
a housing including a USB-C connector configured to be removably coupled with a USB-C PD port to electrically connect the power cable with the USB-C PD port, wherein the power cable is configured to transmit at least one output voltage of a plurality of output voltages to a peripheral device from the USB-C PD port, and wherein the power cable is configured to transmit data to or from the peripheral device;
a control circuit assembly electrically connected with the housing, wherein the control circuit assembly is configured to negotiate an output voltage of the plurality of output voltages between the peripheral device and the USB-C PD port; and
a mechanical securing assembly configured to removably and securely couple the housing about the USB-C PD port, wherein the mechanical securing assembly includes at least one of a press-fit connection configured to couple the housing with the USB-C PD port, a snap-fit connection configured to couple the housing with the USB-C PD port, a tab and slot connection configured to couple the housing with the USB-C PD port, a quick-release connection configured to couple the housing with the USB-C PD port, or a detent ball connection configured to couple the housing with the USB-C PD port.

15. The power cable of claim 14, wherein the housing includes an ethernet connector, wherein the ethernet connector is configured to allow the power cable to provide wired networking capabilities.

16. The power cable of claim 14, wherein the housing includes at least one of a video interface or an audio interface.

17. A method of providing power from a USB-C PD connection, comprising:
providing a power cable including:
a housing including a USB-C connector configured to be removably coupled with a USB-C PD port to electrically connect the power cable with the USB-C PD port, wherein the power cable is configured to transmit at least one output voltage of a plurality of output voltages to a peripheral device from the USB-C PD port, and wherein the power cable is configured to transmit data to or from the peripheral device;
a control circuit assembly electrically connected with the housing, wherein the control circuit assembly is configured to negotiate an output voltage of the plurality of output voltages between the peripheral device and the USB-C PD port; and
a mechanical securing assembly configured to removably and securely couple the housing about the USB-C PD port, wherein the mechanical securing assembly includes at least one of a press-fit connection between the housing and the USB-C PD port, a snap-fit connection between the housing and the USB-C PD port, a tab and slot connection between the housing and the USB-C PD port, a quick-release connection between the housing and the USB-C PD port, or a detent ball connection between the housing and the USB-C PD port;
connecting the housing with the USB-C PD port by employing the mechanical securing assembly;
negotiating, by the control circuit, the output voltage of the plurality of output voltages between the peripheral device and the USB-C PD port;
providing the output voltage of the plurality of output voltages to the peripheral device to power or charge the peripheral device; and
transmitting data through the power cable to the peripheral device.

* * * * *